(12) United States Patent
Hunter et al.

(10) Patent No.: US 10,574,085 B2
(45) Date of Patent: *Feb. 25, 2020

(54) POWER SUPPLY UNIT

(71) Applicant: IPS GROUP INC., San Diego, CA (US)

(72) Inventors: Stephen John Hunter, Randpark Extension (ZA); Andre Malan Joubert, Edenvale (ZA)

(73) Assignee: IPS GROUP INC., San Diego, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/599,827

(22) Filed: May 19, 2017

(65) Prior Publication Data

US 2017/0256983 A1 Sep. 7, 2017

Related U.S. Application Data

(63) Continuation of application No. 15/160,646, filed on May 20, 2016, now Pat. No. 9,692,256, which is a (Continued)

(51) Int. Cl.
*H02J 9/06* (2006.01)
*H02J 7/00* (2006.01)
(Continued)

(52) U.S. Cl.
CPC .............. *H02J 9/061* (2013.01); *G07F 17/24* (2013.01); *H02J 7/0021* (2013.01);
(Continued)

(58) Field of Classification Search
None
See application file for complete search history.

(56) References Cited

U.S. PATENT DOCUMENTS

| 2,161,046 A | 6/1939 | Hitzeman |
| 2,822,682 A | 2/1958 | Sollenberger |

(Continued)

FOREIGN PATENT DOCUMENTS

| CA | 2377010 A1 | 10/2001 |
| CA | 2363915 A1 | 5/2003 |

(Continued)

OTHER PUBLICATIONS

Cell Net Data Systems. First Wireless Monitoring of Parking Meters Results in Theft Arrests Using CellNet Data Systems Technology. PRNewswire, May 11, 1999, 2 pgs.
(Continued)

*Primary Examiner* — Jared Fureman
*Assistant Examiner* — Joel Barnett
(74) *Attorney, Agent, or Firm* — Wilson Sonsini Goodrich & Rosati

(57) ABSTRACT

A power supply unit for supplying power to a device has a rechargeable, main battery; a charging arrangement for charging the main battery; a non-rechargeable back-up battery; load terminals for connection to a load; and a control unit for controlling supply of power to the load primarily from the main battery and secondarily from the back-up battery. The device is, in particular, a single bay, stand alone parking meter. In the event that the main battery runs low, the control unit is configured to supply power to the load from both the main battery and the back-up battery or only from the back-up battery. The back-up battery is easily replaceable, and the power supply unit has a bay, with connectors for receiving the back-up battery. The main battery is charged from solar panels. A communication device is provided to communicate status messages wirelessly to a control system.

27 Claims, 4 Drawing Sheets

Related U.S. Application Data continuation of application No. 13/928,058, filed on Jun. 26, 2013, now Pat. No. 9,391,474, which is a continuation of application No. 12/059,909, filed on Mar. 31, 2008, now Pat. No. 8,513,832.

(60) Provisional application No. 60/909,209, filed on Mar. 30, 2007.

(51) Int. Cl.
   *G07F 17/24* (2006.01)
   *H02J 7/35* (2006.01)

(52) U.S. Cl.
   CPC .......... *H02J 7/0024* (2013.01); *H02J 7/0026* (2013.01); *H02J 7/0044* (2013.01); *H02J 7/355* (2013.01); *H02J 9/06* (2013.01); *Y10T 307/625* (2015.04)

(56) References Cited

U.S. PATENT DOCUMENTS

| | | |
|---|---|---|
| 2,832,506 A | 4/1958 | Hatcher |
| 2,988,191 A | 6/1961 | Grant |
| 3,183,411 A | 5/1965 | Palfi |
| 3,535,870 A | 10/1970 | Harold |
| 3,721,463 A | 3/1973 | Attwood et al. |
| 3,999,372 A | 12/1976 | Welch et al. |
| 4,043,117 A | 8/1977 | Maresca et al. |
| 4,310,890 A | 1/1982 | Trehn et al. |
| 4,460,965 A | 7/1984 | Trehn et al. |
| 4,812,805 A | 3/1989 | Lachat et al. |
| 4,823,928 A | 4/1989 | Speas |
| 4,825,425 A | 4/1989 | Turner |
| 4,875,598 A | 10/1989 | Dahl |
| 4,880,097 A | 11/1989 | Speas |
| 4,895,238 A | 1/1990 | Speas |
| 5,065,156 A | 11/1991 | Bernier |
| 5,201,396 A | 4/1993 | Chalabian et al. |
| 5,222,076 A | 6/1993 | Ng et al. |
| 5,244,070 A | 9/1993 | Carmen et al. |
| 5,273,151 A | 12/1993 | Carmen et al. |
| 5,360,095 A | 11/1994 | Speas |
| 5,382,780 A | 1/1995 | Carmen |
| 5,426,363 A | 6/1995 | Akagi et al. |
| 5,442,348 A * | 8/1995 | Mushell ............... G07F 17/246 194/205 |
| 5,471,139 A | 11/1995 | Zadoff |
| 5,563,491 A | 10/1996 | Tseng |
| 5,614,892 A | 3/1997 | Ward, II et al. |
| 5,617,942 A | 4/1997 | Ward, II et al. |
| 5,640,002 A | 6/1997 | Ruppert et al. |
| 5,642,119 A * | 6/1997 | Jacobs ..................... G07D 3/14 194/217 |
| 5,648,906 A | 7/1997 | Amirpanahi |
| 5,659,306 A | 8/1997 | Bahar |
| 5,710,743 A | 1/1998 | Dee et al. |
| 5,737,710 A | 4/1998 | Anthonyson |
| 5,777,951 A | 7/1998 | Mitschele et al. |
| 5,778,067 A | 7/1998 | Jones et al. |
| 5,806,651 A | 9/1998 | Carmen et al. |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A | 12/1998 | Jacobs et al. |
| 5,954,182 A | 9/1999 | Wei |
| 6,037,880 A | 3/2000 | Manion |
| 6,078,272 A | 6/2000 | Jacobs et al. |
| 6,081,205 A | 6/2000 | Williams |
| 6,111,522 A | 8/2000 | Hiltz et al. |
| 6,116,403 A | 9/2000 | Kiehl |
| 6,195,015 B1 | 2/2001 | Jacobs et al. |
| 6,229,455 B1 | 5/2001 | Yost et al. |
| 6,230,868 B1 | 5/2001 | Tuxen et al. |
| 6,309,098 B1 | 10/2001 | Wong |
| 6,312,152 B2 | 11/2001 | Dee et al. |
| RE37,531 E | 1/2002 | Chaco et al. |
| 6,373,422 B1 | 4/2002 | Mostafa |
| 6,373,442 B1 | 4/2002 | Thomas et al. |
| 6,456,491 B1 | 9/2002 | Flannery et al. |
| 6,457,586 B2 | 10/2002 | Yasuda et al. |
| 6,505,774 B1 * | 1/2003 | Fulcher .............. G06Q 30/0284 235/379 |
| 6,559,776 B2 | 5/2003 | Katz |
| 6,697,730 B2 | 2/2004 | Dickerson |
| 6,747,575 B2 | 6/2004 | Chauvin et al. |
| 6,812,857 B1 | 11/2004 | Kassab et al. |
| 6,856,922 B1 | 2/2005 | Austin et al. |
| 6,885,311 B2 | 4/2005 | Howard et al. |
| 6,914,411 B2 | 7/2005 | Couch et al. |
| 6,929,179 B2 | 8/2005 | Fulcher et al. |
| 7,019,420 B2 | 3/2006 | Kogan et al. |
| 7,019,670 B2 | 3/2006 | Bahar |
| 7,023,360 B2 | 4/2006 | Staniszewski et al. |
| 7,027,773 B1 | 4/2006 | McMillin |
| 7,183,999 B2 | 2/2007 | Matthews et al. |
| 7,222,031 B2 | 5/2007 | Heatley |
| 7,237,716 B2 | 7/2007 | Silberberg |
| 7,388,349 B2 | 6/2008 | Elder et al. |
| 7,748,620 B2 | 7/2010 | Gomez et al. |
| 7,772,720 B2 | 8/2010 | McGee et al. |
| 7,780,072 B1 | 8/2010 | Lute et al. |
| 7,783,530 B2 | 8/2010 | Slemmer et al. |
| 7,806,248 B2 | 10/2010 | Hunter et al. |
| 7,825,826 B2 | 11/2010 | Welch et al. |
| 7,854,310 B2 | 12/2010 | King et al. |
| 7,855,661 B2 | 12/2010 | Ponert |
| 7,933,841 B2 | 4/2011 | Schmeyer et al. |
| 8,138,950 B1 | 3/2012 | Leung |
| 8,395,532 B2 | 3/2013 | Chauvin et al. |
| 8,417,715 B1 | 4/2013 | Bruckhaus et al. |
| 8,479,909 B2 | 7/2013 | King et al. |
| 8,513,832 B2 | 8/2013 | Hunter et al. |
| 8,566,159 B2 | 10/2013 | King et al. |
| 8,590,687 B2 | 11/2013 | King et al. |
| 8,595,054 B2 | 11/2013 | King et al. |
| 8,684,158 B2 | 4/2014 | Jones et al. |
| 8,749,403 B2 | 6/2014 | King et al. |
| 8,770,371 B2 | 7/2014 | Mackay et al. |
| 8,862,494 B2 | 10/2014 | King et al. |
| 8,884,785 B2 | 11/2014 | Groft et al. |
| 9,002,723 B2 | 4/2015 | King et al. |
| 9,047,712 B2 | 6/2015 | King et al. |
| 9,127,964 B2 | 9/2015 | Schwarz et al. |
| 9,391,474 B2 | 7/2016 | Hunter et al. |
| 9,424,691 B2 | 8/2016 | King et al. |
| 9,489,776 B2 | 11/2016 | Kell et al. |
| 9,508,198 B1 | 11/2016 | King et al. |
| 9,661,403 B2 | 5/2017 | King et al. |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0111768 A1 | 8/2002 | Ghorayeb et al. |
| 2003/0092387 A1 | 5/2003 | Hjelmvik |
| 2003/0112597 A1 | 6/2003 | Smith |
| 2003/0121754 A1 | 7/2003 | King |
| 2003/0128010 A1 | 7/2003 | Hsu |
| 2003/0128136 A1 | 7/2003 | Spier et al. |
| 2003/0140531 A1 | 7/2003 | Pippins |
| 2003/0144972 A1 | 7/2003 | Cordery et al. |
| 2003/0169183 A1 | 9/2003 | Korepanov et al. |
| 2003/0179107 A1 | 9/2003 | Kibria et al. |
| 2003/0220835 A1 | 11/2003 | Barnes et al. |
| 2003/0222792 A1 | 12/2003 | Berman et al. |
| 2004/0068434 A1 | 4/2004 | Kanekon |
| 2004/0084278 A1 | 5/2004 | Harris et al. |
| 2004/0181496 A1 | 9/2004 | Odinotski et al. |
| 2004/0254840 A1 | 12/2004 | Slemmer et al. |
| 2004/0264302 A1 | 12/2004 | Ward |
| 2005/0040951 A1 | 2/2005 | Zalewski et al. |
| 2005/0099320 A1 | 5/2005 | Nath et al. |
| 2005/0155839 A1 | 7/2005 | Banks et al. |
| 2005/0178639 A1 | 8/2005 | Brumfield et al. |

(56) References Cited

U.S. PATENT DOCUMENTS

| | | |
|---|---|---|
| 2005/0192911 A1 | 9/2005 | Mattern |
| 2005/0216354 A1 | 9/2005 | Bam et al. |
| 2005/0226201 A1 | 10/2005 | McMillin et al. |
| 2006/0021848 A1 | 2/2006 | Smith |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0267799 A1 | 11/2006 | Mendelson |
| 2007/0016539 A1 | 1/2007 | Groft et al. |
| 2007/0040449 A1 | 2/2007 | Spurlin et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0136128 A1 | 6/2007 | Janacek et al. |
| 2007/0184852 A1 | 8/2007 | Johnson et al. |
| 2007/0210935 A1 | 9/2007 | Yost et al. |
| 2007/0285281 A1 | 12/2007 | Welch et al. |
| 2008/0052254 A1 | 2/2008 | Al Amri et al. |
| 2008/0071611 A1 | 3/2008 | Lovett |
| 2008/0093454 A1 | 4/2008 | Yamazaki et al. |
| 2008/0147268 A1 | 6/2008 | Fuller |
| 2008/0208680 A1 | 8/2008 | Cho |
| 2008/0238715 A1 | 10/2008 | Cheng et al. |
| 2008/0270227 A1 | 10/2008 | Al Amri |
| 2009/0109062 A1 | 4/2009 | An |
| 2009/0192950 A1 | 7/2009 | King et al. |
| 2009/0267732 A1 | 10/2009 | Chauvin et al. |
| 2009/0284907 A1 | 11/2009 | Regimbal et al. |
| 2009/0315720 A1 | 12/2009 | Clement et al. |
| 2010/0106517 A1 | 4/2010 | Kociubinski et al. |
| 2010/0188932 A1 | 7/2010 | Hanks et al. |
| 2010/0332394 A1 | 12/2010 | Ioli |
| 2011/0313822 A1 | 12/2011 | Burdick |
| 2011/0320243 A1 | 12/2011 | Khan et al. |
| 2012/0084210 A1 | 4/2012 | Farahmand |
| 2012/0158466 A1 | 6/2012 | John |
| 2012/0222935 A1 | 9/2012 | Mackay et al. |
| 2012/0285790 A1 | 11/2012 | Jones et al. |
| 2012/0285792 A1 | 11/2012 | Jones et al. |
| 2012/0285793 A1 | 11/2012 | Jones et al. |
| 2012/0286036 A1 | 11/2012 | Jones et al. |
| 2012/0292385 A1 | 11/2012 | Mackay et al. |
| 2013/0005445 A1 | 1/2013 | Walker et al. |
| 2013/0099943 A1 | 4/2013 | Subramanya |
| 2013/0116952 A1 | 5/2013 | Chai |
| 2014/0040028 A1 | 2/2014 | King et al. |
| 2014/0108107 A1 | 4/2014 | Jones et al. |
| 2014/0129158 A1 | 5/2014 | Shea |
| 2014/0174881 A1 | 6/2014 | King et al. |
| 2014/0210646 A1 | 7/2014 | Subramanya |
| 2014/0214499 A1 | 7/2014 | Hudson et al. |
| 2014/0214500 A1 | 7/2014 | Hudson et al. |
| 2014/0229246 A1 | 8/2014 | Ghaffari |
| 2014/0289025 A1 | 9/2014 | King et al. |
| 2015/0084786 A1 | 3/2015 | King et al. |
| 2015/0106172 A1 | 4/2015 | Salama |
| 2015/0235503 A1 | 8/2015 | King et al. |
| 2015/0332587 A1 | 11/2015 | Schwarz et al. |
| 2016/0012418 A1 | 1/2016 | Mackay et al. |
| 2016/0268838 A1 | 9/2016 | Hunter et al. |
| 2016/0321714 A1 | 11/2016 | King et al. |
| 2017/0098339 A1 | 4/2017 | Keller et al. |
| 2018/0025549 A1 | 1/2018 | King et al. |
| 2018/0025629 A1 | 1/2018 | Schwarz et al. |
| 2018/0082488 A1 | 3/2018 | King et al. |
| 2018/0082489 A1 | 3/2018 | King et al. |
| 2018/0082490 A1 | 3/2018 | King et al. |
| 2018/0322534 A1 | 11/2018 | King et al. |

FOREIGN PATENT DOCUMENTS

| | | |
|---|---|---|
| CN | 1037604 A | 11/1989 |
| EP | 0329129 A2 | 8/1989 |
| EP | 0265328 B1 | 12/1992 |
| EP | 0980055 B1 | 9/2001 |
| EP | 0933288 B1 | 4/2005 |
| FR | 2837583 A1 | 9/2003 |
| GB | 2284919 B | 12/1997 |
| JP | 2002042181 A | 2/2002 |
| JP | 2002099640 A | 4/2002 |
| JP | 2005267430 A | 9/2005 |
| KR | 20050038077 A | 4/2005 |
| WO | WO-03005324 A1 | 1/2003 |
| WO | WO-2005031494 A2 | 4/2005 |
| WO | WO-2006095352 A2 | 9/2006 |
| WO | WO-2009154787 A2 | 12/2009 |

OTHER PUBLICATIONS

Co-pending U.S. Appl. No. 15/443,734, filed Feb. 27, 2017.
Co-pending U.S. Appl. No. 15/465,165, filed Mar. 21, 2017.
Co-pending U.S. Appl. No. 15/474,773, filed Mar. 30, 2017.
Decision Denying Institution of Inter Partes Review dated Mar. 30, 2016 of U.S. Pat. No. 7,854,310. IPR Case No. IPR2016-00068.
Decision Denying Inter Partes Review dated Apr. 1, 2016 of U.S. Pat. No. 8,595,054. IPR Case No. IPR2016-00069.
Decision Denying Inter Partes Review dated Apr. 1, 2016 of U.S. Pat. No. 8,595,054. IPR Case No. IPR2016-00070.
Decision Instituting Inter Partes Review dated Mar. 30, 2016 of U.S. Pat. No. 7,854,310. IPR Case No. IPR2016-00067.
Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.
Final Written Decision of U.S. Pat. No. 7,854,310. IPR Case No. IPR2016-00067 dated Mar. 27, 2017.
Flatley. In San Francisco, Hackers Park for Free. Read filed under Misc. Gadgets, downloaded from www.engadget.com website on May 3, 2010, originally posted on Jul. 31, 2009, 5 pages.
Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.
Meter Solutions, Single-Space Meters brochure, downloaded from www.duncansolutions.com website, revised Apr. 2006, 2 pages.
PCT/IB2006/054574 International Preliminary Report on Patentability dated Mar. 10, 2009.
PCT/IB2006/054574 International Search Report dated Oct. 27, 2008.
PCT/US2010/047906 International Preliminary Report on Patentability dated Mar. 6, 2012.
PCT/US2010/047906 International Search Report dated Mar. 30, 2011.
PCT/US2010/047907 International Preliminary Report on Patentability dated Mar. 15, 2012.
PCT/US2010/047907 International Search Report dated Apr. 26, 2011.
PCT/US2012/048190 International Search Report dated Jan. 22, 2013.
Petition for Inter Partes Review of U.S. Pat. No. 7,854,310. IPR Case No. IPR2016-00067, filed Oct. 22, 2015.
Petition for Inter Partes Review of U.S. Pat. No. 7,854,310. IPR Case No. IPR2016-00068, filed Oct. 22, 2015.
Petition for Inter Partes Review of U.S. Pat. No. 8,595,054. IPR Case No. IPR2016-00069, filed Oct. 22, 2015.
Petition for Inter Partes Review of U.S. Pat. No. 8,595,054. IPR Case No. IPR2016-00070, filed Oct. 22, 2015.
Spyker et al. Predicting Capacitor Run Time for a Battery/Capacitor Hybrid Source. Power Electronic Drives and Energy Systems for Industrial Growth. 1998. Proceedings. 1998 IEEE International Conference, pp. 809-814.
The U.S. Conference of Mayors Presents 'Best Practice' Awards, Los Angeles, New Orleans, Elizabeth, N.J. and Long Beach, CA Honored for Excellence & Innovation in Public-Private partnerships, Press Release Jan. 20, 2012.

(56) References Cited

OTHER PUBLICATIONS

Tung. Design of an advanced on-street parking meter. RIT Scholar Works. Thesis/Dissertation Collections (2001).
Jim Bonfield. An Excerise in Changing the Business: Advertising Vending Machines. (4 pgs.) (Feb. 7, 2018).
Order on Stipulation and Joint Motion to Dismiss. Case No. 17-CV-632-CAB (MDD) dated Apr. 18, 2019.
Case No. 15-cv-1526-CAB (MDD) Minute Order of the US District Court, Southern District of California. Document 332, filed Apr. 19, 2019 (1 pgs).
Co-pending U.S. Appl. No. 16/353,921, filed Mar. 14, 2019.

\* cited by examiner

POWER SUPPLY UNIT

CROSS-REFERENCE TO RELATED APPLICATIONS

This application is a continuation of U.S. patent application Ser. No. 15/160,646 filed May 20, 2016, which is a continuation of U.S. patent application Ser. No. 13/928,058 filed Jun. 26, 2013, now U.S. Pat. No. 9,391,474, which is a continuation of U.S. patent application Ser. No. 12/059,909 filed Mar. 31, 2008, now U.S. Pat. No. 8,513,832, which claims the benefit of U.S. Provisional Application No. 60/909,209 filed Mar. 30, 2007, each of which is incorporated in its entirety herein by reference.

FIELD OF THE INVENTION

THIS INVENTION relates to a power supply unit and to a device, in particular a single bay parking meter, having the power supply unit.

SUMMARY OF THE INVENTION

According to the invention, there is provided a power supply unit for supplying power to a device, the power supply unit including a rechargeable, main battery;

a charging arrangement for charging the main battery;

a set of connectors for connection to a back-up battery;

a set of load terminals for connection to a load; and a control unit for controlling supply of power to the load primarily from the main battery and secondarily from the back-up battery.

In an embodiment of the invention the power supply unit has the main battery and the back-up battery. The back-up battery is preferably non-rechargeable.

It will be appreciated that power is taken, in use, from the backup battery in the event that the main battery is inadequate.

Further according to the invention there is provided a device, in particular a parking meter, which has a power supply unit in accordance with the invention.

In the event that the main battery runs low, the control unit is configured to supply power to the load from both the main battery and the back-up battery or only from the back-up battery.

In a preferred embodiment, the back-up battery is easily replaceable. In this embodiment, the power supply unit has a bay for receiving the back-up battery and the connectors are spaced and are such as to permit easy removal and replacement of the back-up battery.

In another embodiment of the invention, the power supply unit further includes a communication device, for communicating messages to a control system. Such messages are selected from the group consisting of: notification that the main battery has been insufficiently recharged, and a notification that power is being supplied from the backup battery.

In a further embodiment of the invention, the communication device may be operable in a wireless manner, and utilizes a cellular telephone network. Thus, with this embodiment, the communication device may have a cellular telephone module.

In an embodiment of the invention, the charging arrangement includes charging terminals for connecting the unit to a solar panel. The device then incorporates the solar panel.

It will be appreciated that in normal operation power is supplied only from the main battery. However, if the main battery is insufficiently recharged, or it is unable to supply the power required by the load, then supplementary power is supplied, partially or totally, from the backup battery, as determined by the control unit.

Preferably, the nominal supply voltage of the backup battery is slightly greater than that of the main battery.

BRIEF DESCRIPTION OF THE DRAWINGS

Embodiments of the invention is now described, by way of example only and without limiting the scope of the invention, with reference to the accompanying figures, wherein.

DETAILED DESCRIPTION

Figure 1:
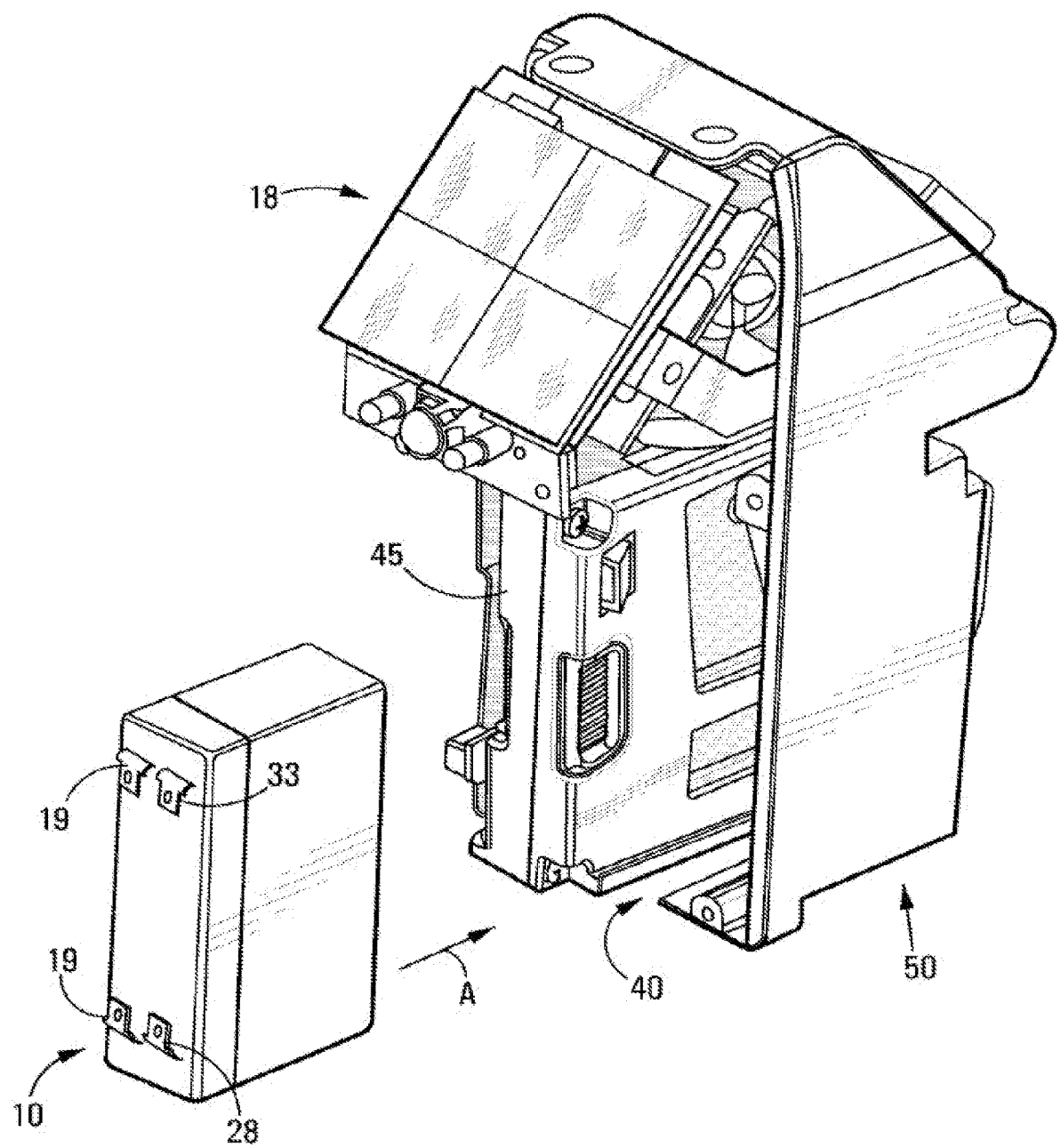
FIG. 1 is an isometric view of a power supply unit in accordance with the invention, shown in alignment with part of a parking meter body.

In the accompanying figures, the power supply unit is generally designated by reference numeral 10 and comprises a rechargeable, main battery 12, a charging arrangement in the form of a diode 34 for charging the main battery 12, a replaceable back-up battery 14, load terminals 19 and a control unit 16 for controlling supply of power to a load 20 connected via the load terminals 19 primarily from the main battery 12 and secondarily from the back-up battery 14 in the event that the main battery 12 is inadequate. The power supply unit 10 further has a solar panel terminal 33 and an auxiliary charging terminal 28.

Figure 3:
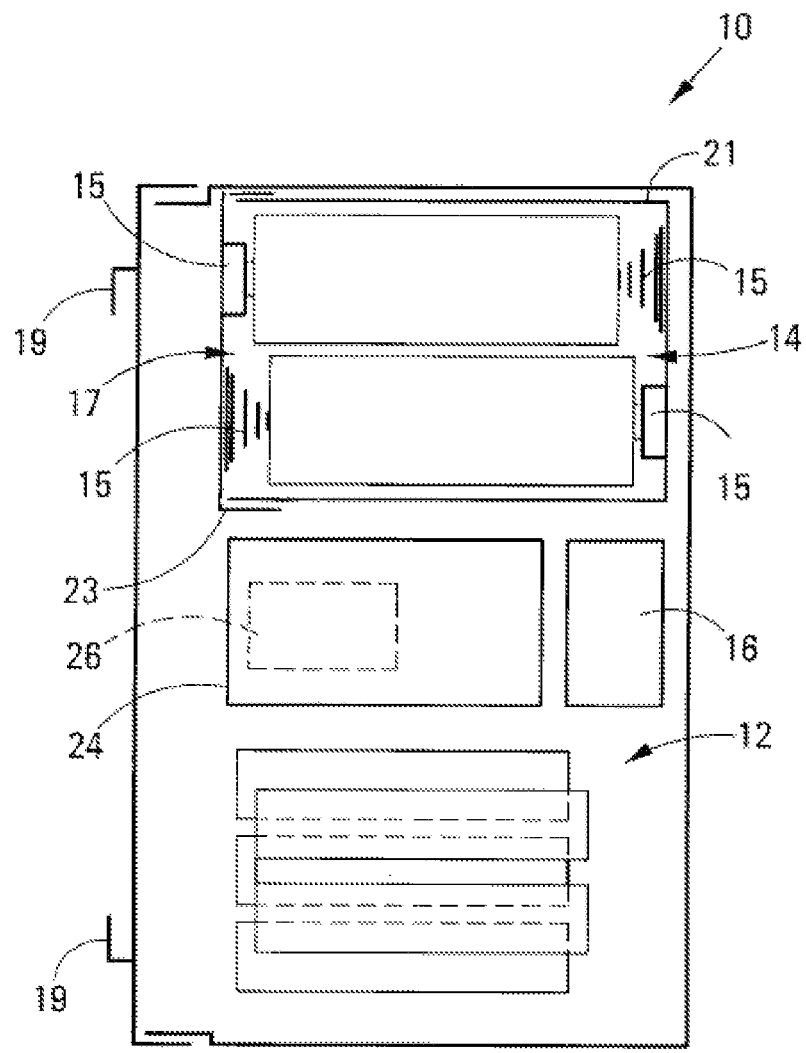
FIG. 3 is a schematic sectioned view of the power supply unit.
Figure 4:
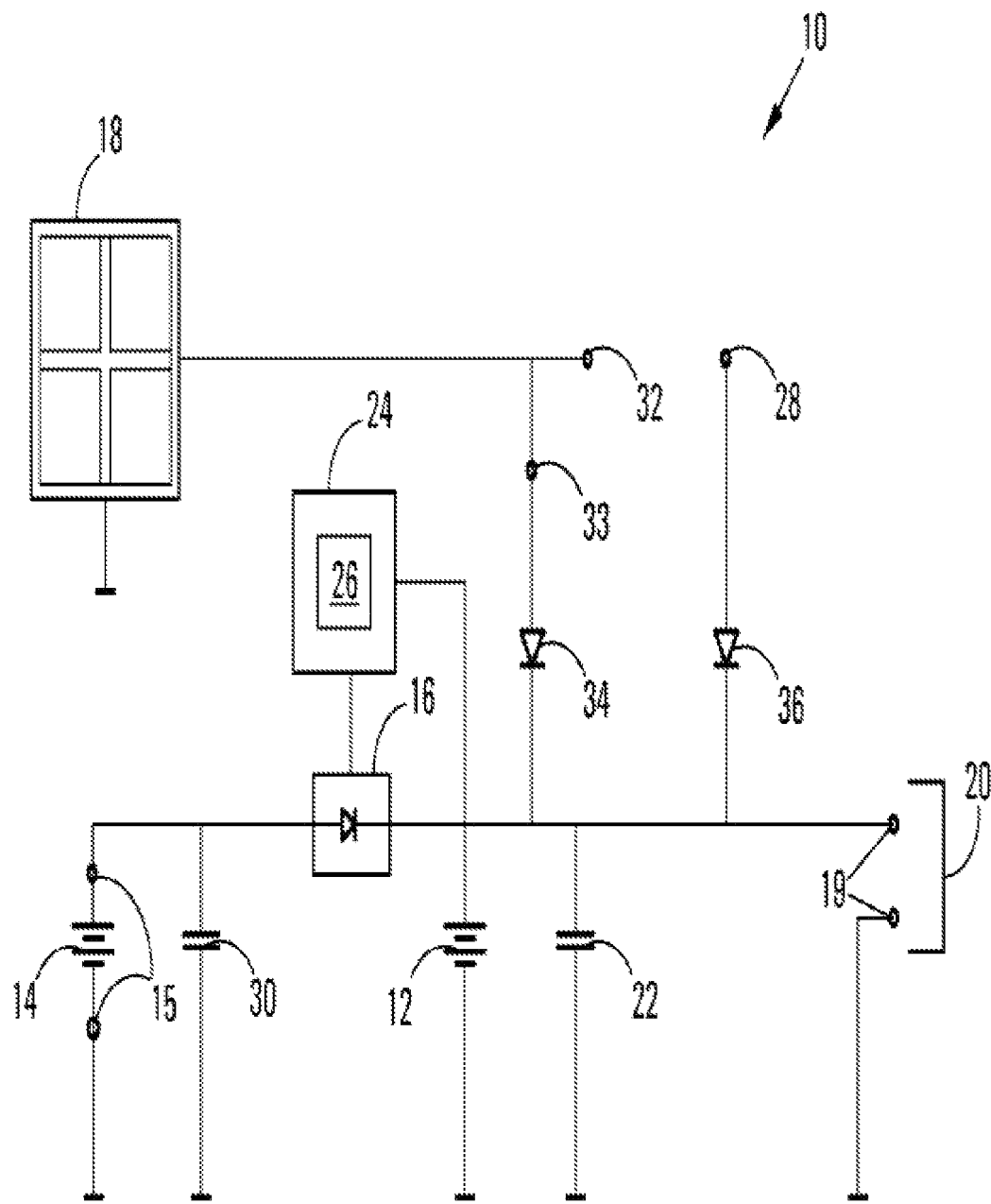
FIG. 4 is a circuit diagram of the power supply unit.

The power supply unit 10 further includes a bay 17 which contains the replaceable backup battery 14. The bay 17 is illustrated in FIG. 3, where it is seen to be defined by a compartment 21 with a lid 23 within the power supply unit 10. The bay 17 has spaced connectors 15 for the backup battery 14. Also shown in FIG. 3 is a communication device 24 with a cellular telephone module 26.

More specifically, in a preferred embodiment of the invention, the main battery 12 comprises an arrangement of five "AA" size nickel cadmium rechargeable cells, which cells are coupled to each other and recharged by solar panels 18 via the solar panel terminal 33. The backup battery 14 comprises a coupled arrangement of two non-rechargeable, disposable "C" size lithium-thionyl chloride cells, and the control unit 16 is a conventional linear, low dropout control unit, known in the trade as the Linear Technology™ model LT1529-5. The control unit 16 controls the supply of power to the load 20 from the main battery 12 and the backup battery 14, in the manner described below.

Figure 2:
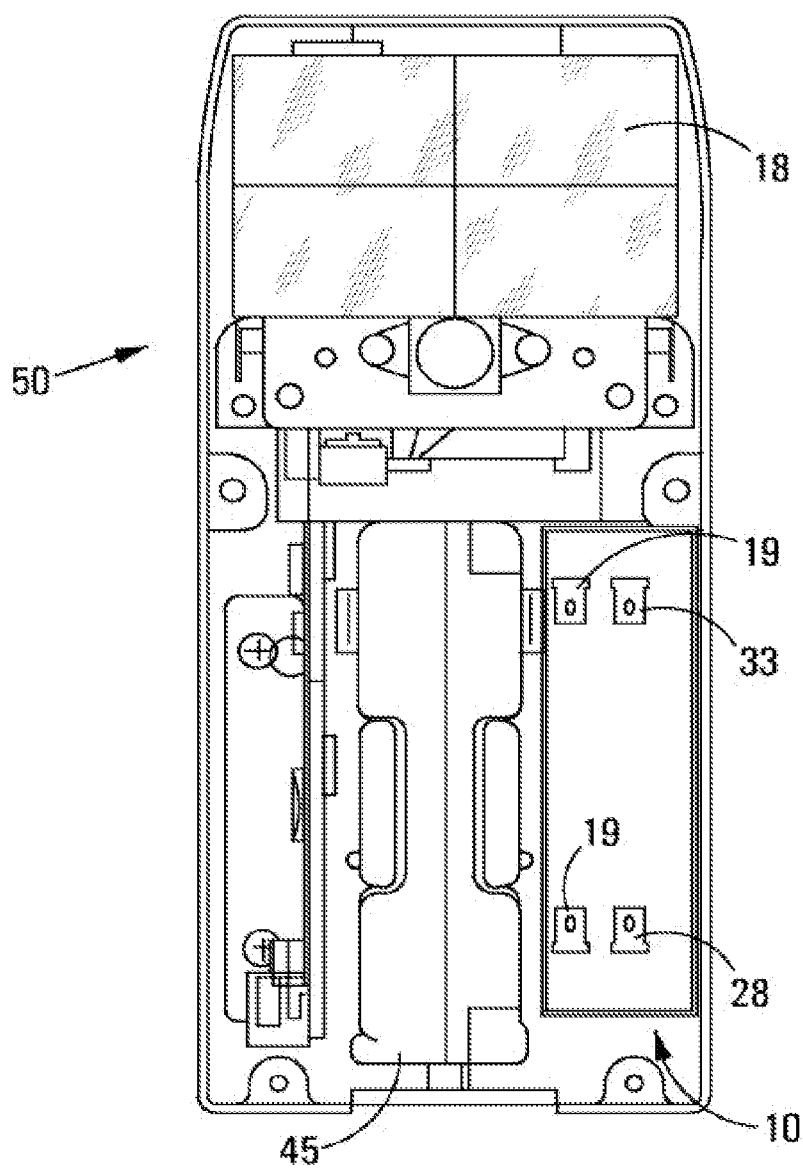
FIG. 2 is a rear view of the part of the parking meter body, depicting the power supply unit when inserted fully therein.

It is not only the power supply unit 10 itself that is the subject of this invention. This invention extends to include a device, in particular a single bay stand alone parking meter 50, having the power supply unit 10 as described above. This is illustrated in FIGS. 1 and 2, in which FIG. 1 depicts the power supply unit 10 aligned for insertion into a complementary dimensioned and configured recess 40 within parking meter 50. The power supply unit 10 is moved into position, in the direction of arrow "A," to fit snugly within the recess 40, as is depicted in FIG. 2. A coin validation unit 45 of the parking meter 50 is not a part of the present invention, but is mentioned for completeness, since the validation unit 45, and other components, such as a timer and a display (not shown) are powered by the power supply unit 10, being connected thereto via the load terminals 19. The parking meter 50 has the solar panels 18 which are connected to the solar panel terminal 33.

The power supply unit 10 is operated as follows. Under favorable conditions, with the main battery 12 being sufficiently charged and with the voltage across the main battery 12 being greater than a predetermined threshold value, the control unit 16 is configured to permit only the main battery 12 to supply power to the load 20. Conversely, under unfavorable conditions, when the main battery is not sufficiently charged, the supply voltage of the main battery 12 is lower than the threshold value, and in such conditions, the control unit 16 is configured to permit power to be supplied also, or only, from the backup battery 14 to the load. It will be appreciated that, in this way, use of the backup battery 14 occurs only when strictly necessary, namely when the voltage across the main battery 12 falls below a predetermined level.

In the particular instance where the power supply unit 10 is for a stand alone parking meter, the nominal supply voltage of the main battery 12 is 6.0V and of the back-up battery 14 7.2V. The control unit 16 is configured to permit power to be supplied from the backup battery 14 when the voltage across the main battery 12 measures 5.5 V or less.

Capacitor 30 is provided to assist during peak power demand and capacitor 22 assists with stability of the regulator 16 and with peak power demand. In alternative embodiments of the invention, a further, external recharging source, such as a portable charger, may be connected via terminal 28. It will be appreciated that the extent of reliance on the backup battery 14 to supply current to circuit 20, is minimized. This, in turn, extends the lifespan of the backup battery 14.

The power supply unit 10 further includes diodes 34 and 36, which serve to prevent reverse current from flowing into the solar panels 18 and an external auxiliary recharging source via terminal 28 respectively.

The communication device 24 communicates notifications to a control system (not shown). Typically, such notifications relate to the state of the main battery 12 and of the backup battery 14. Notifications that are communicated are that the voltage across the main battery 12 has fallen below the predetermined minimum level, and that power is being supplied from the backup battery 14. The communication device 24 communicates these notifications in a wireless manner across a telecommunications network via the cellular telephone module 26.

It will be appreciated by the person skilled in the art that application of this invention is not limited to parking meters only, but that this invention also has application to a multitude of power supply units used to supply current to electrical circuits.

What is claimed is:

1. A parking meter comprising:
   a) a housing;
   b) a rechargeable battery;
   c) a wireless communication device for communicating a status message regarding the status of the rechargeable battery to a control system external to the parking meter;
   d) a non-rechargeable back-up battery; and
   e) a control unit for monitoring the status of the rechargeable battery and signaling the wireless communication device to communicate the status message;
   wherein the rechargeable battery, the non-rechargeable battery, the wireless communication device, and the control unit, are received within the housing of the parking meter.

2. The parking meter of claim 1, wherein the rechargeable battery consists of one to five cells.

3. The parking meter of claim 1, wherein the control unit monitors the status of the voltage across the rechargeable battery.

4. The parking meter of claim 3, wherein the control unit signals the wireless communication device to communicate the status message when the voltage across the rechargeable battery drops below a predetermined level.

5. The parking meter of claim 4, wherein the predetermined level is 5.5V.

6. The parking meter of claim 1, wherein the status message comprises: voltage across the battery, remaining battery charge, remaining battery life, error message indicating battery failure, or a combination thereof.

7. The parking meter of claim 1, wherein the wireless communication device communicates the status message over a telecommunications network.

8. The parking meter of claim 1, wherein the parking meter is a single space parking meter or a dual space parking meter.

9. The parking meter of claim 1, wherein the parking meter is a multi-space parking meter.

10. A power supply for a parking meter comprising:
    a) a rechargeable battery;
    b) a connection to a wireless communication device for communicating a status message regarding the status of the rechargeable battery to a control system external to the parking meter;
    c) a non-rechargeable back-up battery; and
    d) a connection to a control unit for monitoring the status of the rechargeable battery and signaling the wireless communication device to communicate the status message;
    wherein the rechargeable battery, the non-rechargeable back-up battery, the wireless communication device, and the control unit, are received within the parking meter.

11. The power supply of claim 10, wherein the rechargeable battery consists of one to five cells.

12. The power supply of claim 10, wherein the control unit monitors the status of the voltage across the rechargeable battery.

13. The power supply of claim 12, wherein the control unit signals the wireless communication device to communicate the status message when the voltage across the rechargeable battery drops below a predetermined level.

14. The power supply of claim 13, wherein the predetermined level is 5.5V.

15. The power supply of claim 10, wherein the status message comprises: voltage across the battery, remaining battery charge, remaining battery life, error message indicating battery failure, or a combination thereof.

16. The power supply of claim 10, wherein the wireless communication device communicates the status message over a telecommunications network.

17. The power supply of claim 10, wherein the parking meter is a single space parking meter or a dual space parking meter.

18. The power supply of claim 10, wherein the parking meter is a multi-space parking meter.

19. A method for managing the supply of power to a parking meter comprising:

a) monitoring, by a control unit, the status of a rechargeable battery and a non-rechargeable back-up battery; and b) signaling, by the control unit, a wireless communication device to communicate a status message to a control system external to the parking meter regarding the status of the rechargeable battery;

wherein the rechargeable battery, the non-rechargeable back-up battery, the wireless communication device, and the control unit are received within the parking meter.

20. The method of claim 19, wherein the rechargeable battery consists of one to five cells.

21. The method of claim 19, wherein the status of the rechargeable battery monitored comprises the voltage across the rechargeable battery.

22. The method of claim 21, wherein the signaling is triggered by the voltage across the rechargeable battery dropping below a predetermined level.

23. The method of claim 22, wherein the predetermined level is 5.5V.

24. The method of claim 19, wherein the status message comprises: voltage across the battery, remaining battery charge, remaining battery life, error message indicating battery failure, or a combination thereof.

25. The method of claim 19, wherein the wireless communication device communicates the status message over a telecommunications network.

26. The method of claim 19, wherein the parking meter is a single space parking meter or a dual space parking meter.

27. The method of claim 19, wherein the parking meter is a multi-space parking meter.

* * * * *